United States Patent [19]
Lin

[11] Patent Number: 5,231,156
[45] Date of Patent: Jul. 27, 1993

[54] ORGANIC/INORGANIC HYBRID POLYMERS

[75] Inventor: Chia-Cheng Lin, Gibsonia, Pa.

[73] Assignee: PPG Industries, Inc., Pittsburgh, Pa.

[21] Appl. No.: 440,845

[22] Filed: Nov. 24, 1989

Related U.S. Application Data

[63] Continuation of Ser. No. 914,859, Oct. 3, 1986, abandoned.

[51] Int. Cl.$^5$ .................. C08F 30/08; C08G 77/04
[52] U.S. Cl. ................................ 526/279; 528/25; 528/29; 526/240; 526/241
[58] Field of Search .......... 528/29, 25; 526/240, 526/241, 279

[56] References Cited

U.S. PATENT DOCUMENTS

| | | | |
|---|---|---|---|
| 3,249,461 | 5/1966 | Te Grotenhuis | 526/279 |
| 3,941,719 | 3/1976 | Yoldas | 252/463 |
| 3,944,658 | 3/1976 | Yoldas | 423/626 |
| 4,208,475 | 6/1980 | Paruso et al. | 429/193 |
| 4,244,986 | 1/1981 | Paruso et al. | 427/126.4 |
| 4,357,427 | 11/1982 | Ho et al. | 501/153 |
| 4,405,679 | 9/1983 | Fujioka et al. | 428/216 |
| 4,500,669 | 2/1985 | Ashlock et al. | 524/440 |
| 4,571,365 | 2/1986 | Ashlock et al. | 428/412 |

FOREIGN PATENT DOCUMENTS 0170295  5/1986  European Pat. Off. .

OTHER PUBLICATIONS

Philipp et al., New Materials for Contact Lenses Prepared from Si- and Ti-Alkoxides by the Sol-Gel Process, Journal of Non-Crystalline Solids, vol. 63, (1984) pp. 283-292.

Huang et al., Ceramers: Hybrid Materials Incorporating Polymeric/Oligomeric Species with Inorganic Glasses by a Sol-Gel Process, Polymer Bulletin, No. 14, (1985), pp. 557-564.

*Primary Examiner*—Thurman K. Page
*Assistant Examiner*—Peter F. Kulkosky
*Attorney, Agent, or Firm*—Donna L. Seidel

[57] ABSTRACT

Organic-inorganic hybrid polymers and a method of making them by reaction of organic monomers with organofunctional alkoxysilanes are disclosed.

20 Claims, No Drawings

ORGANIC/INORGANIC HYBRID POLYMERS

This is a continuation of application Ser. No. 06/914,859, filed Oct. 3, 1986, now abandoned.

FIELD OF THE INVENTION

The present invention relates generally to the art of organic polymers such as acrylics, and also to the art of inorganic polymers such as silica and/or alumina inorganic oxide polymers prepared by sol-gel processes.

BACKGROUND OF THE INVENTION

U.S. Pat. Nos. 3,941,719 and 3,944,658 to Yoldas describe a transparent nonparticulate alumina prepared by hydrolyzing aluminum alkoxides to form a clear sol which forms a gel, retaining its integrity during drying and pyrolysis.

U.S. Pat. Nos. 4,208,475 and 4,244,986 to Paruso and Yoldas describe a liquid polymer formed from organometallic sodium and aluminum compounds, at least one of which is partially hydrolyzed. The polymer is hydrolyzed, dried to form amorphous sodium Beta-alumina precursor, and then heated to 1200°-1550° C. to form a ceramic comprising ion-conductive sodium Beta-alumina which is useful as a solid electrolyte.

U.S. Pat. No. 4,357,427 to Ho et al discloses a method for preparing alumina doped with a small percentage of magnesia by first forming a mixed clear solution of aluminum alkoxide and a small amount of magnesium in the form of alkoxide or water-soluble magnesium salt, adding an acid and water in excess of the amount required to completely hydrolyze the alkoxide, and allowing the resulting milky slurry to fully hydrolyze to form a clear sol. The sol may be spray-dried to produce a powder, or gelled, dried and mechanically pulverized.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. Nos. 4,500,669 and 4,571,365 to Ashlock et al disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

In the *Journal of Non-Crystalline Solids*, Vol. 63, (1984), Philipp et al disclose in "New Material for Contact Lenses Prepared From Si- and Ti-Alkoxides by the Sol-Gel Process" that it is possible to combine inorganic and organic elements to develop materials with special properties.

In *Polymer Bulletin*, No. 14, (1985) Huang et al disclose in "Ceramers: Hybrid Materials Incorporating Polymeric/Oligomeric Species with Inorganic Glasses by a Sol-Gel Process" a reaction scheme wherein tetraethoxysilane is the alkoxide employed and polydimethyl siloxane is the polymeric component.

U.S. application Ser. No. 06/915,344 filed Oct. 3, 1986 and now U.S. Pat. No. 4,731,264 to Lin et al discloses the preparation of silane/alumina sol-gel compositions by adding an organosilane such as methyl triethoxysilane into an aqueous alumina sol prepared from an aluminum alkoxide.

SUMMARY OF THE INVENTION

To combine the mechanical strength and stability of inorganic materials with the flexibility and solubility of organic materials is an objective of this invention. Organic-inorganic hybrid polymers in accordance with the present invention are prepared by polymerizing an organic monomer in the presence of an inorganic oxide sol comprising an organoalkoxysilane having an organic functional group capable of reacting with said organic monomer.

DESCRIPTION OF THE PREFERRED EMBODIMENT

A sol is prepared by hydrolyzing a metal alkoxide of the general formula $M(OR'')_z$ wherein M is selected from the group consisting of silicon, aluminum, titanium and zirconium, $R''$ is a hydrolyzable alkyl radical and z is the valence of M. Preferably an alumina sol is prepared by hydrolyzing an aluminum oxide in water. Various hydrolyzable aluminum alkoxides of the general formula $Al(OR\Delta)_3$ wherein $R''$ is a lower alkyl radical, may be used to form an alumina sol in accordance with the present invention. In preferred aluminum alkoxides $R''$ has from 2 to 4 carbon atoms; aluminum isopropoxide, $Al(OC_3H_7)_3$, is particularly preferred. The aluminum alkoxide is added to water preferably at a temperature of about 80° C. in order to prevent the formation of insoluble bayerite. An acid hydrolyzing agent is preferably added, e.g., inorganic acids such as nitric or hydrochloric, or organic acids such as acetic or dichloroacetic acid. The aluminum alkoxide hydrolyzes according to the following general reaction

$$Al(OR'')_3 + yH_2O \rightarrow Al(OR'')_{3-y}(OH)_y + yR''OH$$

and the hydrolyzed aluminum alkoxide undergoes condensation and further hydrolysis and condensation according to the general reaction

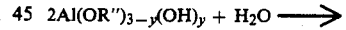

$$2Al(OR'')_{3-y}(OH)_y + H_2O \longrightarrow$$

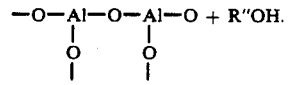

$$-O-Al-O-Al-O + R''OH.$$

In one preferred embodiment of the present invention, the aluminum alkoxide is added to water at 80° C. in a pressure vessel. An acid hydrolyzing agent is added, and the vessel is sealed and heated. Aluminum isopropoxide sol heated to 125° C. for 2 hours reaches a pressure of about 50 psi and forms a clear sol in a matter of hours, rather than days at atmospheric pressure, without precipitation of bayerite.

After the alumina sol is formed, an organoalkoxysilane having a reactive functional organic radical is added. Various organoalkoxysilanes of the general formula $R_xSi(OR')_{4-x}$ wherein R is an organic radical containing a functional group capable of reacting with an organic monomer, $R'$ is a low molecular weight alkyl radical and x is at least one and less than 4, are suitable. The functional group of R is selected in accordance with the organic monomer to be subsequently polymerized. A preferred functional group is acryloxy for reaction with an acrylic monomer capable of polymerization to an acrylic polymer.

In one embodiment of the present invention, an acrylic functional group is chosen for reaction with an acrylic monomer. A preferred organoalkoxysilane for this purpose is methacryloxypropyl trimethoxysilane (MAPTMS). The organoalkoxysilane is preferably added to the alumina sol at ambient temperature, preferably in about equimolar ratio. The organoalkoxysilane reacts with the alumina according to the general reaction

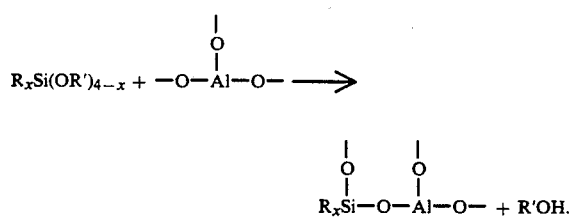

After about 24 hours, the reaction mixture becomes an elastic white gel. The inorganic-based gel may be filtered, washed with deionized water and dried overnight to yield translucent rubbery particles that can be dissolved in alcohol or other organic solvent for polymerization with an organic monomer, preferably methyl methacrylate or isobutyl methacrylate. Preferred proportions range from about 5 to 25 weight percent silane/alumina to methacrylate monomer. If a silica sol is used instead of an alumina sol, the preferred ratio of silane/silica is about ½, and the proportion of silane/silica to methacrylate monomer ranges from about 5 to 25 percent.

The present invention will be further understood from the descriptions of specific examples which follow.

EXAMPLE I

An organic-inorganic hybrid polymer is prepared as follows. A 5 percent alumina sol is prepared by heating 900 grams of water to 80° C. and adding 225 grams of aluminum isopropoxide, $(Al(OC_3H_7)_3)$, and 19.8 grams of glacial acetic acid. Heating at 120° C. for 2 hours in a pressure vessel produces a clear alumina sol. To 130 grams of the alumina sol is added an equimolar amount, 15.8 grams, of methacryloxypropyl trimethoxysilane

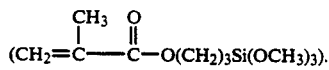

The mixture is stirred, gels in about 45 minutes, and is heated overnight at 60° C. The gel is filtered, rinsed with deionized water and dried overnight at 60° C. One hundred grams of methyl methacrylate plus 0.5 grams of azobisisobutyronitrile catalyst from Dupont are heated in a 70° C. water bath for about 14 minutes before adding 11.02 grams of the gel. Ultrasonic stirring for 10 minutes and heating to 70° C. for 5 minutes result in a clear solution, which is cooled to ambient temperature and cast in a release-coated glass cell. The composition is cured by exposure to ultraviolet radiation of 360 nanometers for 90 minutes, followed by heating to 100° C. for about 25 minutes. This new polymer has better solvent resistance than poly(methyl methacrylate), does not melt at 260° C. and has a Mohs hardness of about 3.

EXAMPLE II

An organic-inorganic hybrid polymer is prepared as follows. Fifty-two grams of tetraethylorthosilicate $(Si(OC_2H_5)_4)$ is dissolved in 42.2 grams of 2-propanol at 53° C., and hydrolyzed with 2.25 grams of water and 0.55 grams of nitric acid. The sol is heated at 53° C. for 60 minutes before adding an additional 2.25 grams of water. After heating another 10 minutes at 53° C., 31 grams of methacryloxypropyltrimethoxysilane

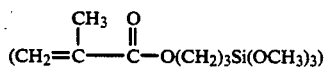

is added, resulting in a silane/silica ratio of ½. The sol is heated for 30 minutes before adding another 4.5 grams of water, and heating at 53° C. continues for another 30 minutes. Solvent is removed by vacuum distillation. To 70 grams of methyl methacrylate containing 0.3 grams of azobisisobutyronitrile, which has been treated at 75° C. for 10 minutes, is added 13.35 grams of the silane/silica composition. The mixture is heated at 75° C. to 80° C. for about 10 minutes before cooling to ambient temperature and casting. The organic-inorganic hybrid is cured under 360 nanometers ultraviolet radiation for 65 minutes followed by 100° C. for 20 minutes. This new organic-inorganic hybrid polymer has a Mohs hardness of about 3, does not melt at 260° C. and is resistant to both acetone and 75 percent sulfuric acid. By comparison, poly(methyl methacrylate) dissolves in acetone and is marked by sulfuric acid.

EXAMPLE III

An organic-inorganic hybrid polymer is prepared as follows. A silane/silica sol is prepared as in the previous example. A mixture of 80 grams of methyl methacrylate and 20 grams of isobutyl methacrylate, plus 0.3 grams of azoisobutyronitrile catalyst, is heated in a 75° C. water bath for about 12 minutes. 12.25 grams of the silica/silane gel is added to the methacrylate monomers, and heating at 75° C. is continued for 9 minutes. The composition is then cast and cured by heating from 60° C. to 97.5° C. for 2 hours, holding the temperature at 97.5° C. for 30 minutes, and cooling to 60° C. before removing the polymer from the casting cell. This inorganic-organic hybrid polymer is also acetone resistant, compared with poly(methyl methacrylate) which dissolves in acetone.

The above examples are offered to illustrate the present invention. Various inorganic compositions containing organic functional groups may be reacted with various organic polymerizable species in a wide range of proportions to obtain a variety of desired properties. The scope of the present invention is defined by the following claims.

I claim:

1. An organic-inorganic hybrid polymer comprising the reaction product of:
   a. 5 to 25 percent by weight of an organofunctional alkoxysilane of the general formula $R_xSi(OR')_{4-x}$ wherein R is an organofunctional radical, R' is a hydrolyzable low molecular weight alkyl group, and x is at least one and less than 4; and b. 95 to 75 percent by weight of an organic monomer capable of reaction with the organofunctional moiety of R and polymerization, wherein said alkoxysilane hydrolyzes and condenses to form the inorganic polymer portion and said organic monomer reacts with said organofunctional radical and further polymerizes to form said organic polymer portion of said organic-inorganic hybrid polymer.

2. An organic-inorganic hybrid polymer according to claim 1, wherein R' is selected from the group consisting of methyl, ethyl, propyl and butyl.

3. An organic-inorganic hybrid polymer according to claim 1, wherein R comprises acrylic functionality.

4. An organic-inorganic hybrid polymer according to claim 3, wherein R is methacryloxypropyl.

5. An organic-inorganic hybrid polymer according to claim 4, wherein said organic monomer is an acrylic monomer.

6. An organic-inorganic hybrid polymer according to claim 5, wherein said organic monomer is methyl methacrylate.

7. An organic-inorganic hybrid polymer according to claim 5, wherein said organic monomer is isobutyl methacrylate.

8. An organic-inorganic hybrid polymer according to claim 3, wherein said organofunctional alkoxysilane is methacryloxypropyl trimethoxysilane.

9. An organic-inorganic hybrid polymer according to claim 1, wherein said organofunctional alkoxysilane further comprises an alkoxide of the general formula $M(OR'')_z$ wherein M is selected from the group consisting of silicon, aluminum, titanium and zirconium, R'' is selected from the group consisting of methyl, ethyl, propyl and butyl, and z is the valence of M.

10. An organic-inorganic hybrid polymer according to claim 9, wherein said alkoxide is selected from the group consisting of tetraethylorthosilicate and aluminum isopropoxide.

11. A method of making an organic-inorganic hybrid polymer comprising the steps of:
  a. hydrolyzing an organofunctional alkoxysilane of the general formula $R_xSi(OR')_{4-x}$ wherein R is an organofunctional radical, R' is a hydrolyzable low molecular weight alkyl group, and x is at least one less than 4;
  b. reacting 5 to 25 percent by weight of said organofunctional alkoxysilane with 95 to 75 percent by weight of a polymerizable organic monomer to form an organic-inorganic hybrid; and
  c. polymerizing said organic-inorganic hybrid to form an organic-inorganic hybrid polymer.

12. A method according to claim 11, wherein R' is selected from the group consisting of methyl, ethyl, propyl and butyl.

13. A method according to claim 12, wherein R comprises acrylic functionality.

14. A method according to claim 13, wherein R is methacryloxypropyl.

15. A method according to claim 13, wherein said organic monomer is an acrylic monomer.

16. A method according to claim 15, wherein said organic monomer is methyl methacrylate.

17. A method according to claim 15, wherein said organic monomer is isobutyl methacrylate.

18. A method according to claim 13, wherein said organofunctional alkoxysilane is methacryloxypropyl trimethoxysilane.

19. A method according to claim 11, wherein said organofunctional alkoxysilane further comprises an alkoxide of the general formula $M(OR'')_z$, wherein M is selected from the group consisting of silicon, aluminum, titanium and zirconium, R'' is selected from the group consisting of methyl, ethyl, propyl and butyl, and z is the valence of M.

20. A method according to claim 19, wherein said alkoxide is selected from the group consisting of tetraethylorthosilicate and aluminum isopropoxide.

* * * * *